(12) United States Patent
Hennigan

(10) Patent No.: US 10,709,137 B2
(45) Date of Patent: Jul. 14, 2020

(54) MOLD REMOVER AND SEALER WITH OPTIONAL TRACER AND METHOD

(71) Applicant: Mark Hennigan, Blackstone, MA (US)

(72) Inventor: Mark Hennigan, Blackstone, MA (US)

( * ) Notice: Subject to any disclaimer, the term of this patent is extended or adjusted under 35 U.S.C. 154(b) by 77 days.

(21) Appl. No.: 15/493,776

(22) Filed: Apr. 21, 2017

(65) Prior Publication Data

US 2017/0304874 A1    Oct. 26, 2017

Related U.S. Application Data

(60) Provisional application No. 62/326,304, filed on Apr. 22, 2016.

(51) Int. Cl.
| | | |
|---|---|---|
| *C11D 3/48* | (2006.01) | |
| *A01N 59/00* | (2006.01) | |
| *C11D 3/20* | (2006.01) | |
| *C11D 3/395* | (2006.01) | |

(52) U.S. Cl.
CPC ............ *A01N 59/00* (2013.01); *C11D 3/2003* (2013.01); *C11D 3/3956* (2013.01); *C11D 3/48* (2013.01)

(58) Field of Classification Search
CPC ................................ C11D 3/48; C11D 3/3953
USPC .......................................................... 510/391
See application file for complete search history.

(56) References Cited

U.S. PATENT DOCUMENTS

| | | | | |
|---|---|---|---|---|
| 6,180,584 B1 * | 1/2001 | Sawan | ................... | A01N 25/10 510/131 |
| 6,726,936 B1 * | 4/2004 | Asano | ................... | A01N 59/16 422/37 |
| 2009/0074881 A1 * | 3/2009 | Kielbania, Jr. | ........ | A01N 37/10 424/616 |

\* cited by examiner

*Primary Examiner* — Gregory E Webb
(74) *Attorney, Agent, or Firm* — Brian M. Dingman; Dingman IP Law, PC

(57) ABSTRACT

The present invention provides a formula and a method for treating mold residue on surfaces. A liquid mold remover comprises a first formula and a second formula, wherein the first formula comprises water, a surfactant, and one or more alcohols, and wherein the second formula comprises water and sodium hypochlorite. The liquid mold remover is evenly applied to the surface affected with mold, and after drying, a liquid mold sealer is evenly applied to the treated surface. The liquid mold sealer comprising water, a surfactant, a suspension of metal particles and an optical tracer.

10 Claims, No Drawings

US 10,709,137 B2

MOLD REMOVER AND SEALER WITH OPTIONAL TRACER AND METHOD

CROSS REFERENCE TO RELATED APPLICATION

The application claims priority of provisional patent application Ser. No. 62/326,304 filed Apr. 22, 2016.

FIELD OF THE INVENTION

The present invention relates to mold removal and prevention formulas, for professional use, that can be made using alcohol and bleach and/or a more eco-friendly anti-mold agent such as ionic or colloidal metals, blended with water and a surfactant that seals against future mold growth, and methods for using the formulas in conjunction with each other for efficient mold treatment, removal, and sealing against future mold growth. The formulas and method may further employ the use of a tracer ingredient, such as a Disodium salt (for example, Disodium Distyrylbiphenyl Disulfonate), that can be detected by UV light after application to confirm that an area has been treated. The formulas and method require proper safety precautions, and are designed for use by mold removal professionals.

BACKGROUND OF THE INVENTION

As the dangers of mold, particularly inside and around a home, have become more widely known, the demand for effective mold removal and prevention has risen. Bleach and other anti-mold chemicals, such as vinegar or alcohol are commonly used to kill mold. As used herein, Bleach refers to an aqueous solution comprising sodium hypochlorite. Other products and methods may include use of toxic compounds, such as caustic soda, or safer oxidizing agents. The current mold-removal products and techniques have shortcomings that the present invention and method seek to address.

Bleach is an effective and common mold remedy. Due to its toxicity, safety precautions must be taken by the user and property owner. However, with proper ventilation, and drying times, bleach can be effective and relatively harmless. The efficacy of bleach on porous surfaces (such as concrete and wood) is limited, and generally requires the use of a surfactant, which acts to assist in penetrating the porous surface. Bleach, even with the aid of a surfactant, does not penetrate porous surfaces well, and requires substantial "sitting time" and/or multiple applications to effectively kill the targeted mold. Long sitting times and multiple applications are not ideal, and require long ventilation periods, and, even when effective, take substantial time and effort, raising the cost and inconvenience to the property owner. Another advantage of bleach is that upon drying, the water evaporates, and the chlorine residue left behind continues to act to prevent further mold growth in the future, though the effective time is limited, since chlorine breaks down fairly rapidly over time.

Natural solutions such as vinegar and alcohol solutions are safer and easier to use than bleach, however they are often less effective and have their own limitations. Though vinegar can penetrate porous surfaces more effectively than bleach without use of a surfactant, vinegar is not as strong as bleach, and may only kill 80-90% of the mold, requiring numerous applications and time. Further, the acidic nature of vinegar may degrade some mineral surfaces, such as marble and granite, limiting its uses. Alcohol is a surface cleaner, but does not penetrate well into porous surfaces. Additionally, alcohol rapidly evaporates and does not leave behind any anti-mold residue to prevent future mold growth.

Alcohol and bleach mixtures are known for improved biocidal behavior over bleach alone, including a significant reduction in the sitting time needed to achieve the same biocidal effectiveness as bleach alone. However, alcohol-bleach mixtures have not been employed in mold removal applications. A study on the relative effectiveness of buffered methanolic bleach solutions in biomedical processes showed significant improvement in the elimination of bacterial spores. See Death, J. and Coates, D. *Journal of Clinical Pathology*, 1979, 31, 148-152 (http://jcp.bmj.com/content/31/2/148).

Some metals, such as silver, zinc and copper, are also known anti-microbial/fungal agents. Ionic and/or colloidal metals can be suspended in solution, and used in a variety of anti-microbial/fungal applications. However, applicant is not aware of any colloidal or ionic metal-based mold removal and prevention products on the market today.

Additionally, after an area is treated, and sealed it is helpful to leave markings so that a property-owner and/or mold-removal professional can clearly see which areas have been treated and sealed. It is simple to leave visible markers in out of the way areas, such as treatments in basements, the framing and joints within a wall, closets and attics. However, for treatments of visible spaces/surfaces, such as interior walls, exterior shingles, and decks, a visible marking is not desirable. Accordingly, applicant has incorporated the use of a fluorescing compound in its mold sealing formula that is invisible in normal light, but that can be detected by a UV "black" light.

SUMMARY OF THE INVENTION

The present invention is a mold removal formula comprising an anti-mold agent, preferably an alcohol and bleach blend or an ionic metal suspension, and a surfactant detergent in water. In the preferred embodiment the formula comprises both an alcohol and bleach blend and an ionic metal suspension, and further comprises a fluorescing tracer ingredient, such as a Disodium salt (for example, Disodium Distyrylbiphenyl Disulfonate), that can be detected by UV light after application to confirm that an area has been treated. In the preferred embodiment, to reduce costs and maximize efficiency, two separate formulas are used and the mold is treated in two distinct steps, mold removal followed by sealing against future mold.

In the preferred embodiment, two formulas work together to eliminate mold, seal against future mold growth, and provide an optical tracer for an easy visual aid to see which areas have been treated. The first formula (mold remover) targets and kills the mold that is present, and comprises alcohol and bleach blended with a surfactant into a water-based solution. The second formula (mold sealer) targets remaining mold residue while sealing against future mold, and comprises an ionic metal (preferably ionic silver or ionic copper) blended with a fluorescent whitening agent visible under UV light, and a surfactant in a water-based solution. It should be understood that the two formulas work as effectively if combined into a single formula. However, combining all ingredients into one formula will increase cost, since all of the ingredients will be used in both the mold removal and the mold sealing stages of the process.

DETAILED DESCRIPTION OF THE INVENTION

A mold remover and sealing formula, as shown in Table 1, comprises water, as the primary solvent, typically between 65%-70%, blended with a surfactant, antimold agents, and an optical brightening "tracer" ingredient.

TABLE 1

| Mold Remover and Sealer | CAS No. | Concentrate (%) |
|---|---|---|
| Water | 7732-18-5 | 67.8 |
| Demox CSG-30 ECO by DeForest (Modified amine oxide) | Proprietary | 16.8 |
| Sec-Propyl Alcohol | 67-63-0 | 6.4 |
| 2-(2-Butoxyethoxy) ethanol | 112-34-5 | 4.8 |
| Sodium Hypochlorite | 7681-52-9 | 2.2 |
| Tinopal CSB-X (Optical Brightener) | See Table 3a | 0.5 |
| Ionized Silver Solution | NA | 1.5 |

A Surfactant is added to act as an emulsifying agent for the mixture, as well as contribute to the mold removal, typically between 15-20%. It is known in the field that the use of a surfactant is effective in cleaning surface mold, and also assists bleach in penetrating and killing mold in porous surfaces, such as wood. The surfactant reduces the surface tension of the water, allowing the bleach solution to penetrate deeper and more effectively into a porous surface, such as wood.

Additionally, the surfactant increases adhesiveness of the formula, which applicant has found to further assist in the targeted mold removal and sealing process, by assuring that the formula adheres to the surface at the point of application, and does not drip or run to other areas, maintaining an even application during the mold removal, drying and sealing processes. Lastly, after drying the surfactant residue left behind maintains its detergent properties and can further assist in sealing against future mold growth. The increased adhesiveness aids this function as well, by holding the mixture evenly in place during the drying process. The mixture does not run, and dries as applied, such that the residue left behind remains evenly dispersed, maximizing its sealing benefits. A modified Amine Oxide, trade name Demox CSG-30, is the surfactant used in the preferred embodiment, but it should be understood that a variety of surfactants can be employed.

One or more alcohols and bleach (sodium hypochlorite) are added to act together as the primary mold removal agents to eliminate the existing mold. In the preferred embodiment a propyl alcohol, typically between 6-7%, and an ethyl alcohol, typically between 4-5%, are used in conjunction with sodium hypochlorite, typically between 2-3%. Alcohol, not only increases the mold killing properties of the bleach, it also speeds up drying times due to the rapid evaporation of the alcohols.

An ionized or colloidal metal with biocidal properties, typically between 1-2%, such as ionic silver, zinc, or copper is added to act as an additional mold removal agent, and more importantly, to seal against future mold growth. The Chlorine in the bleach breaks down rapidly, and the alcohol evaporates, however the metal particles and surfactant residue are left behind as a thin layer after drying. As noted above, the adhesiveness from the surfactant will help maintain an even distribution of the metal and surfactant residue during and after drying.

Lastly, the mixture is provided with a tracer ingredient, such as a Disodium salt (for example, Disodium Distyrylbiphenyl Disulfonate), typically below 1%, that can be detected by UV light after application to confirm that an area has been treated and sealed. The tracer ingredient can be any fluorescent compound that is invisible under normal light, but visible under UV light, provided it does not evaporate, and remains as residue on the surface after drying.

In the preferred embodiment, the formula is divided into two separate mixtures, a mold remover (see Table 2) to be applied during the mold removal process, and a mold sealer (See Table 3) to be applied after the mold removal is complete.

TABLE 2

| Mold Remover | CAS No. | Concentrate (%) |
|---|---|---|
| Water | 7732-18-5 | 69.8 |
| Demox CSG-30 ECO by DeForest (Modified amine oxide) | Proprietary | 16.8 |
| Sec-Propyl Alcohol | 67-63-0 | 6.4 |
| 2-(2-Butoxyethoxy) ethanol | 112-34-5 | 4.8 |
| Sodium Hypochlorite | 7681-52-9 | 2.2 |

TABLE 3

| Mold Sealer with Tracer | CAS No. | Concentrate (%) |
|---|---|---|
| Water | 7732-18-5 | 96 |
| Demox CSG-30 ECO by DeForest (Modified amine oxide) | Proprietary Blend | 2 |
| Tinopal CSB-X (Optical Brightener) | See Table 3a | 0.5 |
| Ionized Silver Solution | NA | 1.5 |

TABLE 3a

| Tinopal CSB-X by BASF (From MSDS) | CAS No. | Concentrate (%) |
|---|---|---|
| Benzenesulfonic acid, 2,2.(1,1'biphenyl)-4,4'-diyldi-2,1-ethenediuyl)bis-,disodium salt | 27344-41-8 | 80-100% |
| N,N-Dimethylformamide | 68-12-2 | 0.1-0.2% |

The mold remover formula comprises the same primary antimold agents (bleach, alcohols, and a surfactant) discussed above and shown in Table 1 and Table 2. The mold sealer comprises the antimold and sealing agents (metal and surfactant) that leave residue behind as well as the tracer (Disodium salt) discussed above and shown in Table 1 and Table 3.

In the preferred method, for cost and time efficiency, the formulas showed in Table 2 and Table 3 are applied separately in two distinct steps. The mold remover (Table 2) formula is applied evenly over the affected surface and allowed to dry. The mold remover application can be repeated as need, until the mold had been effectively removed. After drying the mold sealer with tracer (Table 3) is applied evenly over the area that has been treated with the mold remover.

In one embodiment, the mold remover (Table 2) is provided in two separate mixtures, as shown in Tables 4a and 4b, to be combined prior to use, by the end-user. When combined, the end result is the same formula shown in Table 2.

TABLE 4a

| Mold Remover PART A (4 parts) | CAS No. | Concentrate (%) |
|---|---|---|
| Water | 7732-18-5 | 65 |
| Demox CSG-30 ECO by DeForest | Proprietary | 21 |

TABLE 4a-continued

| Mold Remover PART A (4 parts) | CAS No. | Concentrate (%) |
|---|---|---|
| (Modified amine oxide) | | |
| Sec-Propyl Alcohol | 67-63-0 | 8 |
| 2-(2-Butoxyethoxy) ethanol | 112-34-5 | 6 |

TABLE 4b

| Mold Remover Part B (1 part) | CAS No. | Concentrate (%) |
|---|---|---|
| Sodium Hypochlorite | 7681-52-9 | 11 |
| Water | 7732-18-5 | 89 |

What is claimed is:

1. A liquid mold remover and sealer comprising water, a surfactant, sodium hypochlorite, colloidal copper, and one or more alcohols.

2. The liquid mold remover and sealer of claim 1, further comprising colloidal silver.

3. The liquid mold remover and sealer of claim 1, further comprising an optical tracer.

4. The liquid mold remover and sealer of claim 1, further comprising a suspension of metal particles and an optical tracer.

5. The liquid mold remover and sealer of claim 1, wherein said alcohols include an ethyl alcohol and a propyl alcohol.

6. A liquid mold remover and sealer comprising water, a surfactant, colloidal copper, and an optical tracer.

7. A liquid mold remover and sealer comprising two parts, a first part and a second part;
   said first part comprising water, a surfactant, sodium hypochlorite and one or more alcohols; and
   said second part comprising water, a surfactant, colloidal copper, and an optical tracer;
   wherein the two parts are prepared and stored separately, and combined prior to use, reducing the costs of the mold removal and sealing processes.

8. The liquid mold remover and sealer of claim 7, wherein said alcohols include at least one ethyl alcohol and at least one a propyl alcohol.

9. The liquid mold remover and sealer of claim 6, further comprising colloidal silver.

10. The liquid mold remover and sealer of claim 8, further comprising colloidal silver.

* * * * *